United States Patent [19]
Tsai

[11] Patent Number: 5,893,940
[45] Date of Patent: Apr. 13, 1999

[54] REDUCTION OF NO$_x$ EMISSIONS IN A GLASS MELTING FURNACE

[75] Inventor: Yih-Wan Tsai, Pittsburgh, Pa.

[73] Assignee: PPG Industries, Inc., Pittsburgh, Pa.

[21] Appl. No.: 08/851,208

[22] Filed: May 5, 1997

[51] Int. Cl.$^6$ ........................................................ C03B 5/42
[52] U.S. Cl. .................... 65/29.19; 65/29.12; 65/29.13; 65/134.6
[58] Field of Search .................. 65/29.12, 29.13, 65/29.19, 134.6

[56] References Cited

U.S. PATENT DOCUMENTS

| | | | |
|---|---|---|---|
| 3,294,509 | 12/1966 | Soubier et al. | 65/134 |
| 3,900,554 | 8/1975 | Lyon | 423/235 |
| 4,115,515 | 9/1978 | Tenner et al. | 423/235 |
| 4,117,075 | 9/1978 | Sano | 423/235 |
| 4,138,235 | 2/1979 | Turner | 65/27 |
| 4,216,060 | 8/1980 | Murata et al. | 202/139 |
| 4,298,372 | 11/1981 | Stover et al. | 65/134.6 |
| 4,328,020 | 5/1982 | Hughes | 65/27 |
| 4,372,770 | 2/1983 | Krumwiede et al. | 65/27 |
| 4,496,315 | 1/1985 | Savolskis | 432/30 |
| 4,496,316 | 1/1985 | Tsai | 432/30 |
| 4,506,726 | 3/1985 | Tsai | 165/1 |
| 4,599,100 | 7/1986 | Demarest, Jr. | 65/134 |
| 5,139,755 | 8/1992 | Seeker et al. | 423/235 |
| 5,373,530 | 12/1994 | Perrin | 373/85 |
| 5,431,557 | 7/1995 | Hamos | 431/7 |
| 5,540,897 | 7/1996 | Chu et al. | 422/177 |
| 5,567,394 | 10/1996 | Chu et al. | 422/177 |
| 5,569,312 | 10/1996 | Quirk et al. | 65/134.6 |
| 5,573,568 | 11/1996 | Quirk et al. | 65/134.6 |
| 5,585,081 | 12/1996 | Chu et al. | 423/239.1 |
| 5,585,082 | 12/1996 | Ziebarth et al. | 423/244.07 |

FOREIGN PATENT DOCUMENTS

| | | |
|---|---|---|
| 0 599 547 | 6/1994 | European Pat. Off. . |
| 0 759 412 | 2/1997 | European Pat. Off. . |
| WO 94/06723 | 3/1994 | WIPO . |

*Primary Examiner*—Stanley S. Silverman
*Assistant Examiner*—Sean Vincent
*Attorney, Agent, or Firm*—Andrew C. Siminerio

[57] ABSTRACT

A method of controlling NO$_x$ emissions from a glass melting process in which combustion fuel produces exhaust gas in a melting furnace including NO$_x$ compounds is disclosed. Furnace exhaust gas passes from the melting furnace through a regenerator to a zone downstream from the regenerator. Ammonia is injected into the furnace exhaust gas at the downstream zone while the furnace exhaust gas is within a desired temperature range to reduce the amount of NO$_x$ compounds. Additional gas is introduced into the furnace exhaust gas as it moves from the regenerator to the downstream zone whenever the furnace exhaust gas has a temperature which is outside the desired temperature range at the downstream zone so as to modify the furnace exhaust gas temperature such that the furnace exhaust gas is within the desired temperature range when furnace exhaust gas reaches to the downstream zone. In one particular embodiment of the invention, the additional gas is the exhaust from an excess air burner which is injected into the furnace exhaust gas at a temperature such that the furnace exhaust gas and the injected gas have a combined temperature between about 870 to 1090° C. at the downstream zone.

14 Claims, 2 Drawing Sheets

REDUCTION OF NO$_x$ EMISSIONS IN A GLASS MELTING FURNACE

BACKGROUND OF THE INVENTION

1. Field of the Invention

This invention relates to the reduction of NO$_x$ emissions produced in a large-scale glass melting furnace by controlling the furnace exhaust gas temperature.

2. Technical Considerations

Large-scale melting of glass entails the combustion of large amounts of fuel in a melting furnace in order to provide the required melting temperatures by direct heating. The fuel (generally natural gas or fuel oil) is usually mixed with an excess of air beyond that theoretically required for complete combustion in order to assure that complete combustion of the fuel actually occurs within the furnace, and particularly in the case of flat glass melting operations, to assure that oxidizing conditions are maintained within the furnace. This combination of conditions within a glass furnace is conducive to the oxidation of nitrogen in the combustion air to NO$_x$.

NO$_x$ is a shorthand designation for NO and/or NO$_2$. In the high temperature conditions of a glass melting furnace, the oxide of nitrogen formed is mostly NO with some small amount of NO$_2$, but after exhaust gas containing NO is released to the atmosphere, much of the NO is converted to NO$_2$, which is considered to be an objectionable air pollutant and is believed to be involved in the chemistry of smog formation. Therefore, large volume combustion sources, such as glass melting furnaces, are susceptible to governmental regulations that may severely restrict their operations.

A non-catalytic process for selectively reducing NO to nitrogen and water by injecting ammonia into an exhaust gas stream is disclosed in U.S. Pat. No. 3,900,554 to Lyon. This process may be employed on glass melting furnace exhaust streams as disclosed in U.S. Pat. No. 4,328,020 to Hughes. This patent teaches that effective ammonia reduction of NO$_x$ occurs when the exhaust gas from the furnace is at a temperature in the range of 870 to 1090° C. (700 to 1090° C. when the ammonia is accompanied by hydrogen) and further that such temperature conditions exist or can be created within the flue which connects the primary and secondary regenerator chambers of the furnace's heat recovery system for a substantial portion of each firing cycle in a glass melting furnace. The patent further teaches that ammonia injection is discontinued whenever the temperature of the furnace exhaust gas passing through the flue falls outside this preferred operating range. Although this method is capable of removing a large portion of NO$_x$ from glass furnace exhaust, its overall effectiveness is reduced by the ineffectiveness of the ammonia reduction technique during selected portions of each firing cycle of the melting furnace when the exhaust gas temperatures are unsuitable.

To prolong the effective operating time of an ammonia injection system, U.S. Pat. No. 4,372,770 to Krumwiede et al. discloses a glass melting furnace wherein additional fuel is injected into and burned with excess oxygen in the furnace exhaust gas as it enters the primary regenerators during selected portions of the glass melting process, to increase the furnace exhaust gas temperature so that it is within the desired temperature range for effective NO$_x$ reduction by ammonia injection.

Although these types of systems serve to reduce the NO$_x$ emissions, there are still times during the firing cycle of the glass melting furnace when NO$_x$ emissions are not being reduced by use of the ammonia injection system.

It would be advantageous to have a glass melting furnace arrangement which provides both increased use and more efficient use of the ammonia injection system to further reduce NO$_x$ emissions.

SUMMARY OF THE INVENTION

The present invention provides a method of controlling NO$_x$ emissions from a glass melting process in which combustion fuel produces exhaust gas in a melting furnace including NO$_x$ compounds. Furnace exhaust gas passes from the melting furnace through a regenerator to a zone downstream from the regenerator. Ammonia is injected into the furnace exhaust gas at the downstream zone while the furnace exhaust gas is within a desired temperature range to reduce the amount of NO$_x$ compounds. Additional gas is introduced into the furnace exhaust gas as it moves from the regenerator to the downstream zone whenever the furnace exhaust gas has a temperature which is outside the desired temperature range at the downstream zone so as to modify the furnace exhaust gas temperature such that the furnace exhaust gas is within the desired temperature range when furnace exhaust gas reaches to the downstream zone. In one particular embodiment of the invention, the additional gas is the exhaust from an excess air burner which is injected into the furnace exhaust gas at a temperature such that the furnace exhaust gas and the injected gas have a combined temperature between about 870 to 1090° C. at the downstream zone.

The present invention also provides a furnace for melting glass having a melting chamber and a regenerator in communication with each other such that furnace exhaust gas from the melting chamber passes to and through the regenerator to a zone downstream of the regenerator. Ammonia injectors are positioned within the downstream zone for injecting ammonia into the furnace exhaust gas when the furnace exhaust gas passing through the downstream zone is within a predetermined temperature range to reduce NO$_x$ compounds. Gas injectors introduce gas at a predetermined temperature into the furnace exhaust gas between the regenerator and the downstream zone such that the furnace exhaust gas and the injected gas have a combined temperature at the downstream zone within the predetermined temperature range. In one particular embodiment of the invention, the gas injectors include at least one excess air burner.

DETAILED DESCRIPTION OF THE INVENTION

The present invention will be described herein in connection with a typical flat glass melting furnace, for example as disclosed in U.S. Pat. No. 4,372,770, which is incorporated by reference. However, the principles of the present invention may be applied to any type of glass melting furnace in which the same or similar conditions are encountered.

Figure 1:
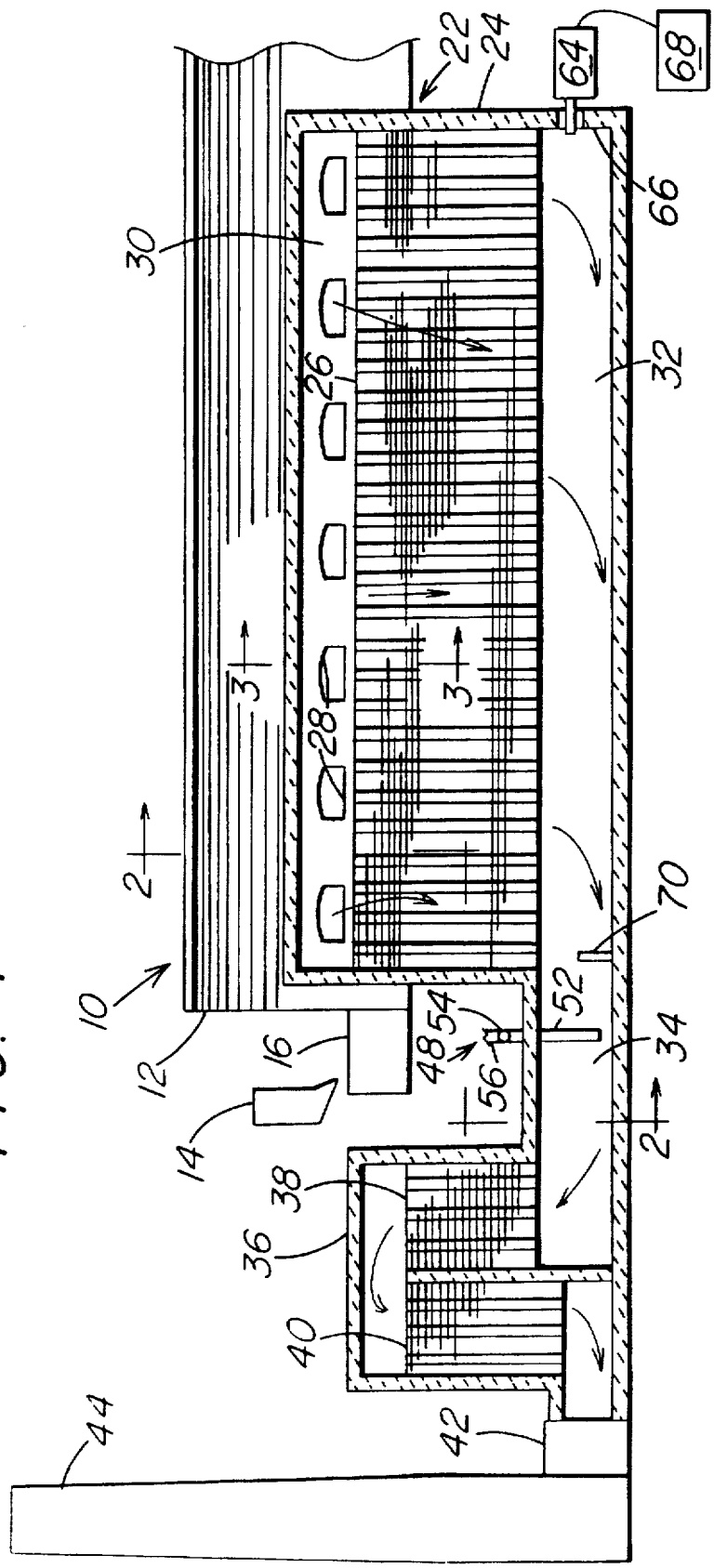
FIG. 1 is a side view of a flat glass melting furnace along a longitudinal cross section through the regenerator system. The regenerator includes a primary and secondary regenerator and an ammonia injection grid positioned in a flue between the regenerators.
Figure 2:
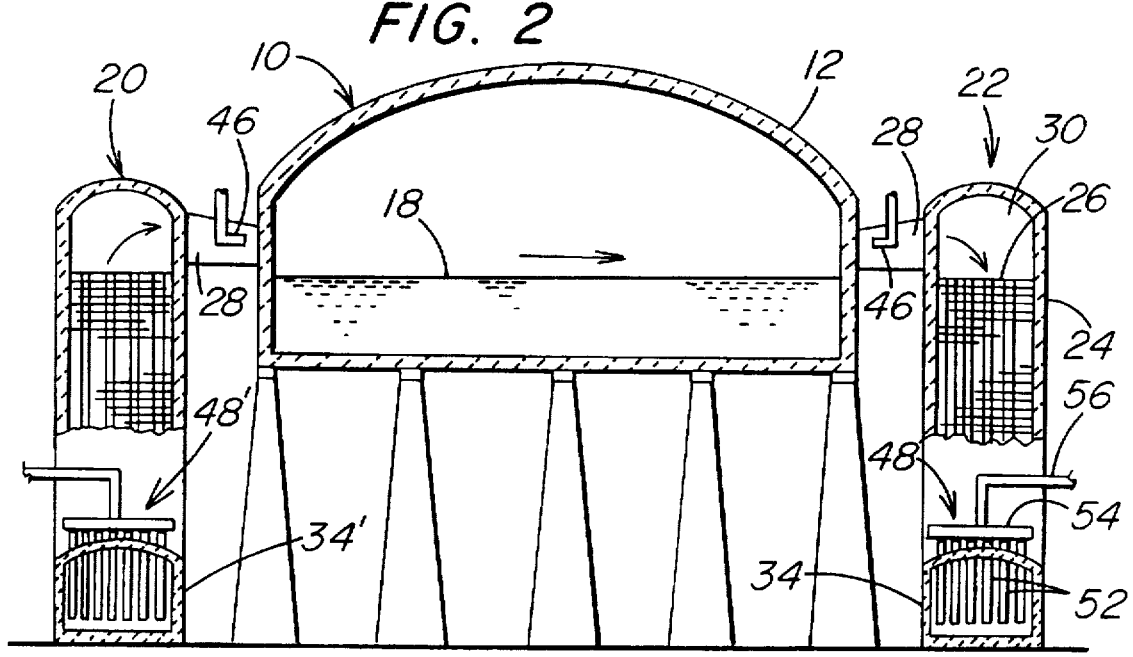
FIG. 2 is a view of the glass melting furnace of FIG. 1 taken along line 2—2 of FIG. 1.

FIGS. 1 and 2 illustrate a conventional flat glass melting furnace 10 having a melting chamber 12. Raw glass-making ingredients are fed from a hopper 14 into an inlet extension 16 of the furnace and are deposited into a pool of molten glass 18 contained within the melting chamber 12. The furnace 10 is of the well-known crossfired regenerative type wherein the melting chamber 12 is flanked by a pair of primary regenerators 20 and 22 of like construction. Each regenerator includes a refractory housing 24 containing a bed of regenerator packing 26 which comprises a checker structure of refractory brick permitting the passage of air and exhaust gas therethrough. Each of the primary regenerators 20 and 22 communicate with the melting chamber 12 by means of a plurality of ports 28 spaced along the sides of the melting chamber 12. Each port 28 opens at one end to the interior of the melting chamber 12 and at the other end to a plenum space 30 above the packing 26 of the primary regenerator. Below the packing 26 in each regenerator is a distributing space 32 which communicates at one end with a flue 34. In the embodiment shown in FIG. 1, the flue 34 leads to a secondary regenerator 36 which may include a first pass checker packing 38 and a second pass checker packing 40. From the secondary regenerator, the exhaust gas flows through a reversing valve mechanism 42 and then to a smokestack 44.

Gas flows through the furnace 10 are reversed periodically (for example about every 10 minutes). In the mode of operation depicted in the drawings, the gas flows are from left to right (as viewed in FIG. 2) wherein incoming combustion air enters through the left-hand regenerator 20 and exhaust gas exits from the melting chamber 12 through the right-hand regenerator 22. The incoming combustion air is preheated by the regenerator packings of regenerator 20 and fuel (natural gas or oil) is mixed with the preheated air by means of nozzle burners 46 in the left-hand ports 28, whereby resulting flames extend from left to right over the molten glass 18 within the melting chamber 12. During this phase of the firing cycle, the burner nozzles 46 in the right-hand port 28 remain inactive. The exhaust gas leaves the melting chamber 12 through the right-hand ports 28 and passes through the primary regenerator 22 where heat from the exhaust gas is transferred to the checker packing 26. In the embodiment depicted in FIGS. 1 and 2, the recovery of waste heat by the regenerator system is only partially accomplished by the primary regenerator 22. Additional heat recovery is accomplished further downstream in the secondary regenerator 36. After a predetermined length of time, the firing of nozzles 46 is reversed. More specifically, the burner nozzles on the left side of the furnace 10 are turned off and the burner nozzles on the right side are turned on, and incoming combustion air is passed through the right-hand regenerator 22 and the exhaust gas leaves the melting chamber 12 by way of the left-hand regenerator 20.

With continued reference to FIGS. 1 and 2, there is shown an arrangement for selective non-catalytic reduction of $NO_x$. More particularly, an ammonia injection system 48 is positioned in each flue 34 and 34' between each primary regenerator and the corresponding secondary regenerator. Although not limiting in the present invention, the ammonia injection system 48 as illustrated in FIG. 2 includes a grid comprised of a plurality of tubes 52 of a heat resistant material extending into the flue 34. Each tube 52 is in communication with a header pipe 54 which in turn communicates with the supply pipe 56. A plurality of openings or nozzles along each tube 52 are arranged to promote thorough mixing of ammonia with substantially the entire stream of exhaust gas passing through the flue 34. An identical grid arrangement may be provided in the flue 34' on the opposite side of the furnace 10. In a glass melting furnace of this type, it has been found that the temperatures of the exhaust gases passing through the flue 34 lie within the preferred $NO_x$ reduction range of 870 to 1090° C. (1598 to 1994° F.) during a portion of the exhaust phase of the firing cycle. This range may be expanded to 700 to 1090° C. (1292 to 1994° F.) when the ammonia is combined with hydrogen as disclosed in U.S. Pat. No. 4,372,770. The amount of time the furnace exhaust gas is within this range depends on the firing rate, firing duration, packing density and packing volume.

In the firing mode depicted in the figures, ammonia injection takes place in the right-hand ammonia injection system 48 while the left-hand system 48' is turned off. Typically, the exhaust gas exits the furnace 12 and enters the regenerator at a temperature of about 1537 to 1704° C. (2800 to 3100° F.). As the exhaust gas passes through the regenerator, it transfers heat to the packing and is cooled. Immediately after a firing reversal, the temperature of the exhaust gas passing through the flue 34 on the exhaust side is generally found to be below the desired $NO_x$ reduction range but will rise to be within the desired range within about 1 to 3 minutes, whereupon ammonia injection may be initiated. Ammonia injection continues as the temperature of the furnace exhaust gas in the flue continues to rise until its temperature exceeds the desired $NO_x$ reduction temperature range, whereupon ammonia injection may be discontinued. However, it should be appreciated that depending on the firing rate, firing duration, packing density and packing volume, the furnace exhaust gas may be within the required temperature range immediately after the firing reversal. In such a situation, it is expected that the furnace exhaust gas will become too hot earlier the firing cycle to effectively reduce $NO_x$ by ammonia injection.

The process of reducing $NO_x$ by ammonia injection may include variations, e.g. as disclosed in U.S. Pat. No. 3,900,554; 4,115,515; 4,328,020 and 4,372,770.

Figure 3:
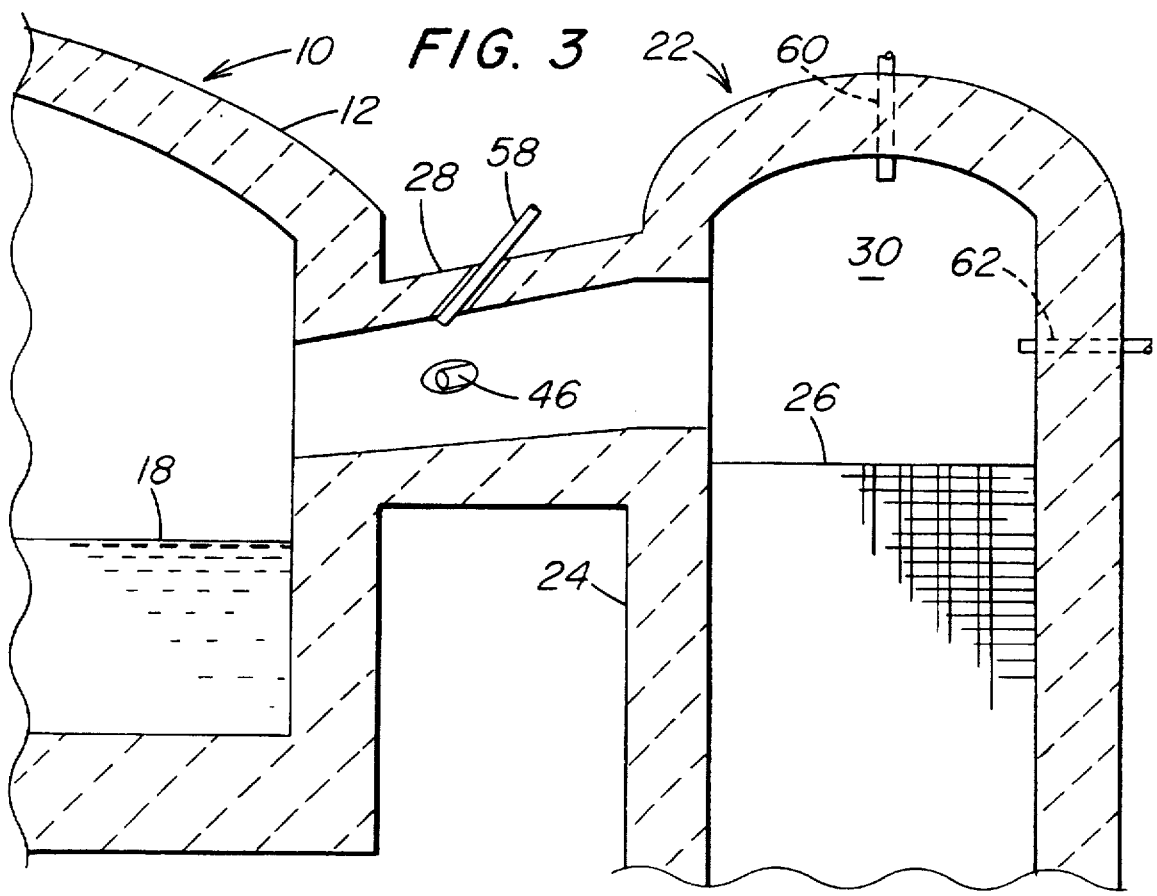
FIG. 3 is an enlarged cross sectional view along a port and the upper portion of a regenerator.

To further reduce $NO_x$ emissions, afterburning may be incorporated into the melting process as disclosed in U.S. Pat. No. 4,372,770. Afterburning is a process of injecting fuel into the furnace exhaust gas and burning it with the furnace exhaust gas as it passes through the primary regenerators 20 and 22. Afterburning serves to suppress $NO_x$ formation by consuming oxygen in the furnace exhaust gas that would otherwise be available for $NO_x$ formation. It is also believed that the absence of oxygen causes $NO_x$ in the furnace exhaust gas to decompose and that the presence of a combustible fuel causes chemical reduction of $NO_x$. All of the above mechanisms require that afterburning be carried out at a temperature where $NO_x$ formation is likely. It is believed that the best results are achieved when the combustible fuel is mixed with furnace exhaust gas that is at a temperature of at least 1420° C. (2600° F.). In the particular embodiment of the invention illustrated in FIGS. 2 and 3, fuel is combined with the furnace exhaust gas at the upper end of the primary regenerator. More specifically, a fuel nozzle 58 is positioned to extend into the neck portion of port 28 from above. The nozzle 58 is angled counter to the direction of exhaust gas flow and it is expected that the fuel may be injected into the exhaust gas at about 50 to 500 feet per second (STP) (15 to 150 meters per second) to effectively mix with the furnace exhaust gas. Fuel injection nozzles 60 and 62 shown in phantom lines in FIG. 3 illustrate alternate but less effective locations for fuel injection in the region of the upper plenum space 30 in approximate alignment with the respective port 28. Fuel may be injected from a plurality of nozzles associated with each port to further enhance mixing. Fuel injection may also take place slightly inside the melting chamber 12 in front of a port mouth. It should be appreciated that it is not always necessary to inject fuel at each port 28 and partial advantages may be obtained by equipping only a portion of the ports with afterburning capabilities. It is not uncommon in a multiport furnace for different ports to be fired at different rates and with different fuel/air ratios. Therefore, in some cases it could be most productive to limit afterburning to those ports having greater firing rates and/or the greatest amounts of excess oxygen remaining in the exhaust gas.

The fuel employed for afterburning may be any combustible hydrocarbon commonly employed as a furnace fuel, and most conveniently the same fuel employed in the melting chamber 12, which is most commonly natural gas (methane). The amount of fuel injected is preferably near the amount stoichiometrically required for complete consumption of oxygen in the exhaust gas stream at the location of injection. Maximum afterburning of the exhaust gas stream from the furnace 10 requires the use of additional fuel in an amount up to about 15 percent of the fuel consumed in melting chamber 12, depending on the amount of excess air in the exhaust gas. Lower amounts of fuel are required when the exhaust gas includes lower amounts of air. This additional fuel may be concentrated in only a few ports where the greatest amounts of excess oxygen are found since, as discussed earlier, it is common to operate a glass melting furnace with varying degrees of oxidation potential from one port to another. Those ports fired with the highest air to fuel ratios may be responsible for a major portion of the $NO_x$ formation and thus afterburning efforts may be concentrated on the exhaust side of those ports.

It should be appreciated that afterburning will also raise the temperature of the furnace exhaust gas more quickly so that $NO_x$ reduction via the ammonia injection system 48 may be initiated earlier in the firing cycle. However, it should be further appreciated that afterburning has been found to produce an increase in the temperatures of the checker packing in the regenerators, e.g. on the order of 40 to 45° C. (70 to 80° F.). As a result, in those cases where support elements for the checker packing 26 are near their upper temperature limit, it may be desirable to monitor their temperature and to limit the amount of afterburning accordingly.

The temperature of the furnace exhaust gas will vary as it exits the primary regenerators 20 and 22 and enters the distributing space 32. For example, as discussed earlier there may be a period of time immediately following the firing reversal when the exhaust gas exiting the primary regenerators 20 and 22 into distributing space 32 is below the preferred range for effective $NO_x$ reduction by ammonia injection system 48. In addition, depending on the length of each firing cycle, the exhaust gas may reach a temperature above the desired range such that the injection system 48 is not as effective in removing $NO_x$ emissions. To control the temperature of furnace exhaust gas as it flows through distributing space 32 and flue 34 to the ammonia injection system 48 during the firing cycle, the present invention utilizes an excess air burner 64. An excess air burner is a burner that combines fuel (for example, natural gas, oil or other combustible hydrocarbon material) with excess ambient or preheated air, i.e. more air than the stoichiometric amount of air required to burn the fuel. The amount of excess air supplied to the burner is used to control the amount of heat generated by the burner 64. More specifically, when the exhaust from the burner 64 combines with the furnace exhaust gas, the temperature of the furnace exhaust gas will increase or decrease and thus change the furnace exhaust gas temperature within distributing space 32 and flue 34. By controlling the fuel/air ratio and the amount of fuel burned by burner 64, the temperature of the furnace exhaust gas may be controlled. The excess air burner 64 will also burn additional combustibles, if present, in the exhaust gas as it passes through the distributing space 32.

In the particular embodiment of the invention illustrated in FIG. 1, the burner 64 is positioned at the lower portion of wall 66 of the primary regenerator 22 to direct its exhaust directly into distributing space 32. As an alternative multiple burners may be positioned along space 32. A controller 68 is linked to the burner 64 to control the amount of fuel and air burned by the burner 64 and thereby control the furnace exhaust gas temperature within distributing space 32. If desired, a temperature indicator 70 may be positioned within space 32 and/or flue 34 to monitor the temperature of the furnace exhaust gas from the primary regenerators 20 and 22. This indicator 70 may be linked to controller 68 to control the fuel/air mixture of the burner 64 and assure that the combined flow of furnace exhaust gas and burner gas is within the desired temperature range for effective reduction of $NO_x$ from the furnace exhaust gas as it passes through grid of ammonia injection system 48. It should be appreciated that when the temperature monitor 70 is positioned within flue 34, prior to introducing the excess air burner exhaust into distributing space 32, monitor 70 monitors the temperature of the furnace exhaust gas only, while after introduction of exhaust gas from the excess air burner 64, the temperature indicator 70 monitors the combined temperature of the furnace exhaust gas and the burner exhaust. If the indicator 70 is positioned within or at the bottom of the regenerator packing, it will monitor the temperature of the furnace exhaust gas only.

As an alternative to using an excess air burner 64, ambient air may be injected into the furnace exhaust gas as it passes through the distributing space 32 in order to control furnace exhaust gas temperature and optimize $NO_x$ reduction at the ammonia injection system 48. However, it is preferred that an excess air burner 64 be used as discussed above because the burner 64 can burn over a wide temperature range and provide better temperature control of the exhaust gas.

The excess air burner 64 as disclosed herein reduces $NO_x$ emissions in two ways. First, it prolongs the time during which the ammonia injection system 48 operates effectively by changing the furnace exhaust gas temperature so that it is within a desired operating range for a greater period of time. More specifically, the burner 64 may be fired to supply exhaust gas having a temperature greater than the furnace exhaust gas and provide additional heat and increase the temperature of the furnace exhaust gas early in the firing cycle. The burner 64 may also be fired to produce an exhaust gas temperature which is lower than the furnace exhaust gas temperature so as to reduce the furnace exhaust gas temperature, if required, later in the firing cycle. Second, if desired the burner 64 may be used to further control the furnace exhaust gas temperature within a narrower temperature range so that the ammonia injection system 48 may operate at its peak efficiency. As discussed earlier, it is preferred that the exhaust gas be the temperature in the range of 870 to 1090° C. but it is believed that the efficiency of the injection system 48 would be improved if the furnace exhaust gas was delivered to system 48 within a temperature range of 927 to 1010° C. (1700 to 1850° F.).

The forms of the invention shown and described in this disclosure represent preferred embodiment and it is understood that various changes may be made without departing from the scope of the invention as defined in the following claims.

We claim:

1. A method of controlling $NO_x$ emissions from a glass melting process in which combustion fuel produces exhaust gas in a melting furnace including $NO_x$ compounds, and said furnace exhaust gas passes from said melting furnace through a regenerator and to a zone downstream from said regenerator, wherein said furnace exhaust gas has a temperature at said downstream zone which fluctuates within a first temperature range, comprising the steps of:

injecting ammonia into said furnace exhaust gas at said downstream zone while said furnace exhaust gas is within a second temperature range, which is within said first temperature range, to reduce the amount of $NO_x$ compounds;

introducing additional gas at a desired temperature into said furnace exhaust gas as it moves from said regenerator to said downstream zone to modify said furnace exhaust gas temperature;

monitoring said furnace exhaust gas temperature; and modifying said additional gas temperature in response to changes in said furnace exhaust gas temperature such that said furnace exhaust gas and said additional gas have a combined temperature which is within said second temperature range when reaching said downstream zone.

2. The method as in claim 1 wherein said additional gas introducing step includes the step of injecting gas into said furnace exhaust at a temperature such that said furnace exhaust gas and said injected gas have a combined temperature between about 870 to 1090° C. at said downstream zone.

3. The method as in claim 2 wherein said gas injecting step includes the step of injecting gas at a temperature such that said furnace exhaust gas and said injected gas have a combined temperature between about 927 to 1010° C. at said downstream zone.

4. The method as in claim 2 wherein said gas injecting step includes the step of directing exhaust from at least one excess air burner at a desired temperature into said furnace exhaust gas at a zone between said regenerator and said downstream zone.

5. The method as in claim 1 further including the step of injecting hydrogen into said furnace exhaust gas during said ammonia injecting step, and wherein said additional gas introducing step includes the step of injecting gas at a temperature such that said furnace exhaust gas and said injected gas have a combined temperature between about 700 to 1090° C. at said downstream zone.

6. The method as in claim 1 wherein said burner exhaust directing step includes the step of directing said burner exhaust into a distribution space below said regenerator.

7. The method as in claim 4 further including the step of injecting hydrogen into said furnace exhaust gas during said ammonia injecting step.

8. A method of controlling $NO_x$ emissions from a glass melting process in which combustion fuel produces exhaust gas in a melting furnace including $NO_x$ compounds, and said furnace exhaust gas passes from said melting furnace through a regenerator and to a zone downstream from said regenerator, wherein said furnace exhaust gas has a temperature at said downstream zone which fluctuates within a first temperature range, comprising the steps of:

injecting ammonia into said furnace exhaust gas at said downstream zone while said furnace exhaust gas is within a second temperature range of about 870 to 1090° C., which is within said first temperature range, to reduce the amount of $NO_x$ compounds;

injecting exhaust from at least one excess air burner at a desired temperature into said furnace exhaust gas as it moves from said regenerator to said downstream zone;

monitoring said furnace exhaust gas temperature; and modifying said burner exhaust temperature in response to changes in said furnace exhaust gas temperature such that said furnace exhaust gas and said burner exhaust have a combined temperature which is within said second temperature range when reaching said downstream zone.

9. The method as in claim 8 wherein said burner exhaust injecting step includes the step of injecting exhaust at a temperature such that said furnace exhaust gas and said injected exhaust have a combined temperature between about 927 to 101° C. at said downstream zone.

10. The method as in claim 8 wherein said burner exhaust injecting step includes the step of directing said burner exhaust into a distribution space below said regenerator.

11. The method as in claim 8 further including the step of injecting hydrogen into said furnace exhaust gas during said ammonia injecting step.

12. The method as in claim 8 wherein when said furnace exhaust gas temperature is below said second temperature range, said burner gas temperature is greater than said furnace exhaust gas temperature, and when said furnace exhaust gas temperature is above second temperature range, said burner exhaust temperature is less than said furnace exhaust gas temperature.

13. The method as in claim 8 further including the step of monitoring said furnace exhaust gas temperature as it passes from said regenerator to said downstream zone.

14. The method as in claim 13 further including the step of injecting fuel into said furnace exhaust gas in a zone between said melting furnace and said regenerator so as to consume oxygen in said furnace exhaust gas by combustion of said injected fuel.

* * * * *